E. WALRATH.
ADJUSTABLE HORSE COLLAR.
APPLICATION FILED SEPT. 27, 1910.
1,040,820.
Patented Oct. 8, 1912.
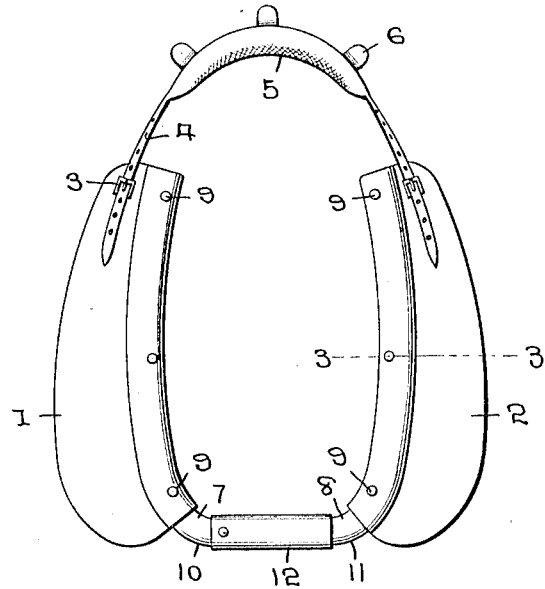
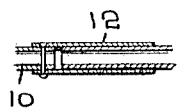
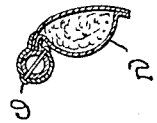
WITNESSES:
Thos. W. Riley
M. Newcomb
INVENTOR
E. Walrath
BY
W. J. FitzGerald & Co.
Attorneys

UNITED STATES PATENT OFFICE.

EDWARD WALRATH, OF LA FARGEVILLE, NEW YORK.

ADJUSTABLE HORSE-COLLAR.

1,040,820.  Specification of Letters Patent.  Patented Oct. 8, 1912.

Application filed September 27, 1910. Serial No. 584,075.

*To all whom it may concern:*

Be it known that I, EDWARD WALRATH, a citizen of the United States, residing at La Fargeville, in the county of Jefferson and State of New York, have invented certain new and useful Improvements in Adjustable Horse-Collars; and I do hereby declare the following to be a full, clear, and exact description of the invention, such as will enable others skilled in the art to which it appertains to make and use the same.

This invention relates to certain new and useful improvements in adjustable horse collars, the object being to provide a collar which is so constructed that the same will adjust itself to the animal on which it is placed in such a manner that all danger of the shoulders of the animal becoming injured by using a collar which does not fit, is prevented.

Another object of my invention is to provide a collar which is formed of a pair of side pads adjustably connected together in such a manner that when the hames are placed in position on the same, they will be drawn together and held on the animal in their proper positions.

A still further object of my invention is to provide means for supporting the side pads with straps and buckles, whereby the same can be readily adjusted.

A still further object of my invention is to provide a pad which is exceedingly simple and cheap in construction, and one in which the parts are so constructed that they will be held in their proper shapes.

With these objects in view, the invention consists in the novel features of construction, combination and arrangement of parts, hereinafter fully described and pointed out in the claim.

In the drawing forming a part of this specification: Figure 1 is a front elevation of my improved adjustable collar. Fig. 2 is a detail section through the coupling sleeve. Fig. 3 is a section taken on line 3—3 of Fig. 1.

Referring to the drawing, 1 and 2 indicate the side pads of my improved collar provided with buckles 3, in which are secured straps 4 carried by a neck pad 5 for supporting the side pads in their proper positions, and said neck pad 5 is provided with guides 6 to receive the hames and hold the same in their proper positions.

The pads 1 and 2 are provided with stiffening members 7 and 8 which are secured in position therein by rivets 9, and said stiffening members 7 and 8 are preferably formed of tubes bent to the proper shape and provided with angled lower ends 10 and 11 of unequal length. Secured on the end 10 of the stiffening member 7 is a coupling sleeve 12, into which the end 11 of the stiffening member 8 is adapted to extend in such a manner that it is free to move within the sleeve 12 in order to allow the pads to move in respect to each other whereby the same will adjust themselves to the animal on which they are placed and during the muscular exertions of the animal. The pads are held in their proper positions on the animal by the hames (not shown) so that after the pads have been placed in position and the hames are adjusted they will be drawn together so as to snugly fit the shoulders of the animal.

What I claim is:

In combination with a horse collar adapted to be used with hames, side pads, a stiffening member comprising a piece of equidiametrical tubing secured to each side pad and adapted to be engaged by the hames, the lower ends of the stiffening members being bent at approximately right angles to their upper portions so that the said lower ends are rectilinear and in alinement with each other, a cylindrical sleeve surrounding and secured to one of said rectilinear ends, the other of said rectilinear ends being slidably seated in the sleeve and adapted to become properly adjusted therein by means of the inward pressure of the hames and the outward pressure of the horse's neck.

In testimony whereof I have signed my name to this specification in the presence of two subscribing witnesses.

EDWARD WALRATH.

Witnesses:
 DUVARD LAWRENCE,
 HARRY G. VAN COUGHUET.